(12) United States Patent
Kienzle et al.

(10) Patent No.: US 7,413,701 B2
(45) Date of Patent: Aug. 19, 2008

(54) CLUTCH LININGS COMPRISING FIBER-REINFORCED CERAMIC MATERIALS

(75) Inventors: Andreas Kienzle, Möttingen Ot Balgheim (DE); Mario Krupka, Adelsried (DE); Gustavo Cabello, Augsburg (DE); Jens Rosenloecher, Augsburg (DE)

(73) Assignee: SGL Carbon AG (DE)

( * ) Notice: Subject to any disclaimer, the term of this patent is extended or adjusted under 35 U.S.C. 154(b) by 135 days.

(21) Appl. No.: 10/919,827

(22) Filed: Aug. 17, 2004

(65) Prior Publication Data
US 2005/0040003 A1    Feb. 24, 2005

(30) Foreign Application Priority Data
Aug. 20, 2003 (DE) ................ 103 38 199

(51) Int. Cl.
*C01B 31/36* (2006.01)
*C04B 33/36* (2006.01)
*C04B 35/64* (2006.01)

(52) U.S. Cl. .............. 264/658; 264/682; 264/29.1; 264/29.2; 264/176.1; 264/211.22; 264/211.21

(58) Field of Classification Search ............. 264/29.1, 264/29.2, 682, 658, 176.1, 211
See application file for complete search history.

(56) References Cited

U.S. PATENT DOCUMENTS

| | | | | |
|---|---|---|---|---|
| 4,297,307 | A * | 10/1981 | Taylor | ............... 264/29.5 |
| 6,193,027 | B1 * | 2/2001 | Krenkel et al. | ....... 188/218 XL |
| 6,248,269 | B1 * | 6/2001 | Dietrich et al. | ........... 264/29.1 |
| 6,261,981 | B1 | 7/2001 | Dietrich et al. | |
| 6,265,071 | B1 | 7/2001 | Gross et al. | |
| 6,662,920 | B2 | 12/2003 | Hofer et al. | |
| 6,838,162 | B1 * | 1/2005 | Gruber et al. | ........... 428/293.4 |
| 2002/0029944 | A1 | 3/2002 | Krenkel et al. | |
| 2003/0057040 | A1 | 3/2003 | Bauer et al. | |
| 2003/0106751 | A1 | 6/2003 | Bauer et al. | |
| 2003/0129375 | A1 | 7/2003 | Bauer et al. | |
| 2003/0138672 | A1 | 7/2003 | Bauer et al. | |

FOREIGN PATENT DOCUMENTS

| | | |
|---|---|---|
| DE | 197 11 829 | 9/1998 |
| DE | 197 27 585 | 2/1999 |
| DE | 199 39 545 | 2/2001 |
| DE | 101 57 583 | 12/2002 |
| EP | 1 188 947 | 3/2002 |
| EP | 1 273 818 | 1/2003 |
| EP | 1 319 640 | 6/2003 |
| EP | 1 323 944 | 7/2003 |
| JP | 08109083 A * | 4/1996 |
| WO | WO-93/11185 | 6/1993 |
| WO | WO-01/55611 | 8/2001 |

OTHER PUBLICATIONS

Machine Translation of Japanese Patent Publication JP 08-109083 A, obtained from PAJ website (http://www19.ipdl.inpit.go.jp/PA1/cgi-bin/PA1INIT?1188333291772) on Aug. 27, 2007.*
English Language Translation: Matsumoto, T., "Composite Material, Method for Making the Same, and Sliding Sealing Part Therefrom", JP 08-109083, Publication date: Apr. 30, 1996.*

* cited by examiner

*Primary Examiner*—Steven P. Griffin
*Assistant Examiner*—Jason L. Lazorcik
(74) *Attorney, Agent, or Firm*—Connolly Bove Lodge & Hutz LLP

(57) ABSTRACT

Clutch linings comprising fiber-reinforced ceramic materials which contain short carbon fibers and whose matrix has a mass fraction of at least 40% of silicon carbide, process for producing them and their use in clutch systems, in particular for motor vehicles.

5 Claims, No Drawings

CLUTCH LININGS COMPRISING FIBER-REINFORCED CERAMIC MATERIALS

FIELD OF THE INVENTION

The invention relates to clutch linings comprising fiber-reinforced ceramic materials.

BACKGROUND OF THE INVENTION

Clutch systems are used in motor vehicles for separating the engine and gearbox. In modern vehicles, virtually exclusive use is made of friction clutches or hydrodynamic transmissions. In the customary friction clutch, force-transmitting connection between the shaft from the engine and the shaft entering the gearbox is established by means of one or more disks pressed against one another, with at least one clutch disk connected to the shaft entering the gearbox, which has linings on both sides, being located between the flywheel of the engine and a clutch pressure plate. When the clutch pedal is depressed, the pressure plate is pushed away from the clutch disk against the spring force of the disk spring, as a result of which the clutch disk is released. The connection between the engine and the gearbox is thereby interrupted.

The magnitude of the torque which can be transmitted depends on the area and the diameter of the clutch disk and on the spring force of the disk spring. For large torques, clutch systems having a relatively large friction area or multidisk clutches are therefore used. The clutch disk is, especially on starting, subject to wear by rubbing and is heated by the friction.

In view of this prior art, it is an object of the invention to provide clutch systems which can transmit large torques at small construction sizes. Preference is given to single-disk systems which have relatively small friction areas.

Friction pairings with ceramic materials, in particular fiber-reinforced ceramic materials, are known. When used as brake disks, high heat resistance and a coefficient of friction which has a low dependence on the load are required. In the case of clutch systems, high static friction and high torsional stiffness are desired.

In WO 93/11185, clutch disks are disclosed which have friction surfaces composed of a plurality of layers which alternately contain continuous carbon fibers and short carbon fibers and in each case pitch as impregnant.

In WO-A 01/55611, multidisk clutches immersed in an oil bath are disclosed, in which steel disks lined with braided continuous carbon fibers act against steel disks whose friction surface is coated with a thin layer of nickel powder.

The application of continuous carbon fibers or textiles made of these is complicated. Furthermore, the experiments on which the invention is based have shown that the preferential orientation of the fibers in the plane of the linings produced from continuous carbon fibers or textiles in which these are present is relatively unfavorable for achieving a high static friction. For this reason, linings for clutch disks which are simple to manufacture and display high static friction values are desirable.

In DE-A 199 39 545 clutch disks are disclosed which are provided with friction linings comprising silicon carbide reinforced with carbon fibers. It can also be provided for the flywheel and pressure plate forming a friction pairing with the linings to be made of silicon carbide reinforced with carbon fibers. Otherwise, nothing is said about the type of material used.

SUMMARY OF THE INVENTION

In view of this prior art, it has to be ensured that a sufficient static friction is realised.

The object of the invention is achieved by clutch linings comprising fiber-reinforced ceramic materials which contain short carbon fibers and whose matrix has a mass fraction of at least 40% of silicon carbide.

The linings comprising fiber-reinforced ceramic materials are preferably affixed to a carrier made of metal or fiber-reinforced ceramic. Fastening can be effected by adhesive bonding, screwing, riveting or by means of other suitable joining techniques.

The invention therefore also provides clutch disks which comprise a carrier made of metal or a fiber-reinforced ceramic material and are provided with linings comprising fiber-reinforced ceramic materials which comprise short carbon fibers and whose matrix has a mass fraction of at least 40% of silicon carbide.

DETAILED DESCRIPTION OF THE PREFERRED EMBODIMENTS

The matrix of the fiber-reinforced ceramic materials preferably comprises from 60% to 90% of silicon carbide, from 0% to 30% of elemental silicon and from 0% to 10% of elemental carbon. The mass fraction of the short carbon fibers in the ceramic material is preferably from 20% to 60%, particularly preferably from 25% to 50% and in particular from 30% to 35%.

The weight average length of the short carbon fibers is preferably from 0.001 mm to 30 mm, particularly preferably from 0.1 mm to 15 mm and in particular from 0.2 mm to 5 mm. Their diameter is from 4 µm to 12 µm, preferably from 5 µm to 10 µm and in particular from 6 µm to 8 µm.

The linings comprising the fiber-reinforced ceramic material preferably have a thickness of from 2 mm to 6 mm and have the shape of rounded rectangles, rounded trapezoids or ring segments, with the dimension in the direction of the clutch disk radius preferably being from 10 mm to 30 mm and that in the circumferential direction preferably being from 10 mm to 90 mm. Preference is given to at least two, more preferably at least three and particularly preferably at least four, of these linings being arranged symmetrically around the circumference of the clutch disk.

Particular preference is given to choosing the length of the fibers so that the average of the projection of their length onto the normal to the largest area of the clutch linings is from 10% to 95%, preferably from 20% to 90% and particularly preferably from 30% to 85%, of the thickness of the linings.

The materials for the linings can be produced by a multistage process in which in the first step, short carbon fibers are mixed with carbonizable materials which soften upon heating (hereinafter referred to as "binders"), these mixtures are in the second step, pressed with application of pressure and heat to form bodies whose dimensions correspond to the desired linings, the pressed bodies are, in the third step, converted into porous carbon bodies interspersed by short carbon fibers with retention of their shape by heating in the absence of oxidizing agents, and in the fourth step, bringing these carbon bodies into contact with a silicon-containing melt under reduced pressure, so that the melt penetrates into the porous body and fills its pores, with at least part of the carbon reacting with the silicon to form silicon carbide.

According to the invention, it is also possible to choose the amount of melt in the fourth step so that the pores are not completely filled with the silicon-containing melt. The remaining accessible pores can then be filled, in a preferred embodiment, with a further melt which has a melting point of at least 550° C., preferably at least 600° C. Apart from metals which meet this condition, e.g. aluminum, iron, chromium, nickel, copper, molybdenum, tungsten, vanadium, niobium, tantalum, titanium and zirconium, preference is also given here to, in particular, alloys such as brass and bronze. The mass fraction of these metals in the matrix is preferably from 2% to 20%.

If mounting holes are necessary for attaching the linings to the clutch disk, they can advantageously be introduced into the porous carbon bodies obtained in the third step.

A preferred production variant for the materials according to the invention utilizes a continuous process in which the mixture of the short fibers and the binder is produced in a mixer and is introduced into a continuous screw extruder and extruded through a die which corresponds to the shape of the desired linings. The extrudate is then cut up, and the blanks obtained are carbonized and treated with the silicon-containing melt as described above. As a result of this method of manufacture, the preferential orientation of the short carbon fibers is perpendicular to the friction surface of the linings, and this has been found to have a particularly favorable effect on the level of the static friction.

The invention claimed is:

1. A process for producing clutch linings comprising fiber-reinforced ceramic materials, said clutch linings having a largest area, and a friction surface, and having a thickness of from 2 mm to 6 mm and having the shape of rounded rectangles, rounded trapezoids or ring segments, which comprises producing in a mixer a mixture of short carbon fibers and a binder which binder consists of a carbonizable material which softens upon heating said mixture, introducing the mixture into a continuous screw extruder and extruding through a die which corresponds to the shape of the desired linings, then cutting up the extrudate to produce blanks and converting said blanks into porous carbon bodies with retention of the shape of blank by heating in the absence of oxidizing agents, and bringing the porous carbon bodies into contact with a silicon-containing melt under reduced pressure so that the melt penetrates into the porous carbon body and fills the pores of the porous carbon body under formation of a fiber-reinforced ceramic material with at least part of the porous carbon body formed in the converting step reacting with the silicon from the silicon-containing melt to form a matrix of the fiber-reinforced ceramic materials comprising silicon carbide, wherein the silicon-containing melt in the melt contacting step is used in such amount that said pores are not completely filled with the silicon-containing melt, so that incompletely filled pores remain, and then filling said incompletely filled pores with a second melt of metals or alloys which second melt has a melting point of at least 550° C., and wherein the matrix of the fiber-reinforced ceramic materials comprises mass fractions of from 60% to 90% of silicon carbide, from 0% to 30% of elemental silicon and from 0% to 10% of elemental carbon, wherein the fibers have a preferential orientation perpendicular to the friction surface of the linings, and wherein the length of the fibers is chosen such that the average of the projection of their length onto the normal to the largest area of the clutch linings is from 10% to 95% of the thickness of the lining.

2. The process of claim 1, wherein the said second melt comprises metals selected from the group consisting of aluminium, iron, chromium, nickel, copper, molybdenum, tungsten, vanadium, niobium, tantalum, titanium, and zirconium, or alloys selected from the group consisting of bronze and brass.

3. The process of claim 1 wherein the mass fraction of the short carbon fibres in the ceramic fiber-reinforced material is from 20% to 60%.

4. The process of claim 1 wherein the weight average length of the short carbon fibres is from 0.001 mm to 30 mm, and their diameter is from 4 μm to 12 μm.

5. The process of claim 2, wherein the matrix of the fiber-reinforced ceramic materials comprises mass fractions of from 2% to 20% of the said metals or alloys.

* * * * *